US007177918B2

(12) United States Patent
Joshi et al.

(10) Patent No.: US 7,177,918 B2
(45) Date of Patent: Feb. 13, 2007

(54) METHOD AND SYSTEM FOR EFFICIENTLY PROCESSING MULTIFRAME DATA IN A CLIENT/SERVER COMPUTING ENVIRONMENT

(75) Inventors: Niraj P. Joshi, Cary, NC (US); Jason C. Plurad, Durham, NC (US); Billy R. Rowe, Jr., Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 10/325,142

(22) Filed: Dec. 20, 2002

(65) Prior Publication Data
US 2004/0122971 A1 Jun. 24, 2004

(51) Int. Cl.
*G06F 15/16* (2006.01)
*G06F 15/173* (2006.01)

(52) U.S. Cl. .................. 709/219; 709/203; 709/217; 709/224; 709/236

(58) Field of Classification Search ............... 709/205, 709/203, 217, 224, 236, 219; 707/513; 713/201; 715/501.1, 744, 201
See application file for complete search history.

(56) References Cited

U.S. PATENT DOCUMENTS

| | | | |
|---|---|---|---|
| 6,144,991 A * | 11/2000 | England | 709/205 |
| 6,151,599 A | 11/2000 | Shrader et al. | |
| 6,593,944 B1 * | 7/2003 | Nicolas et al. | 715/744 |
| 7,000,008 B2 * | 2/2006 | Bautista-Lloyd et al. | 709/219 |
| 2002/0023110 A1 | 2/2002 | Fortin et al. | |
| 2002/0152239 A1 * | 10/2002 | Bautista-Lloyd et al. | 707/513 |
| 2002/0188862 A1 * | 12/2002 | Trethewey et al. | 713/201 |
| 2004/0205514 A1 * | 10/2004 | Sommerer et al. | 715/501.1 |

\* cited by examiner

*Primary Examiner*—Rupal Dharia
*Assistant Examiner*—Quang N. Nguyen
(74) *Attorney, Agent, or Firm*—Gerald R. Woods; Marcia L. Doubet

(57) ABSTRACT

Techniques are disclosed for efficiently and selectively reloading frames of a multiframe Web page or a multiframe window. Multiple frames may be reloaded as a result of the server sending its response to a single client request message. Server-side logic maintains an awareness of which frames need to be reloaded, regardless of whether that need results from something synchronous with the client's request for a frame or asynchronous to that request. Then, when the client requests data for a single frame, in addition to sending content for the requested frame, the server also sends data to cause reloading of the other frames that need to be reloaded (and only those frames). Preferably, the data to cause reloading of the other frames comprises indicators (such as scripting code) that will force the client to request reloading of each of these other frames. Multiple reload requests may be collapsed into a single response. The disclosed techniques apply also to frames to be initially loaded. Bandwidth is used efficiently, and flashing of browser frames is reduced. No additional client-side logic is required.

30 Claims, 14 Drawing Sheets

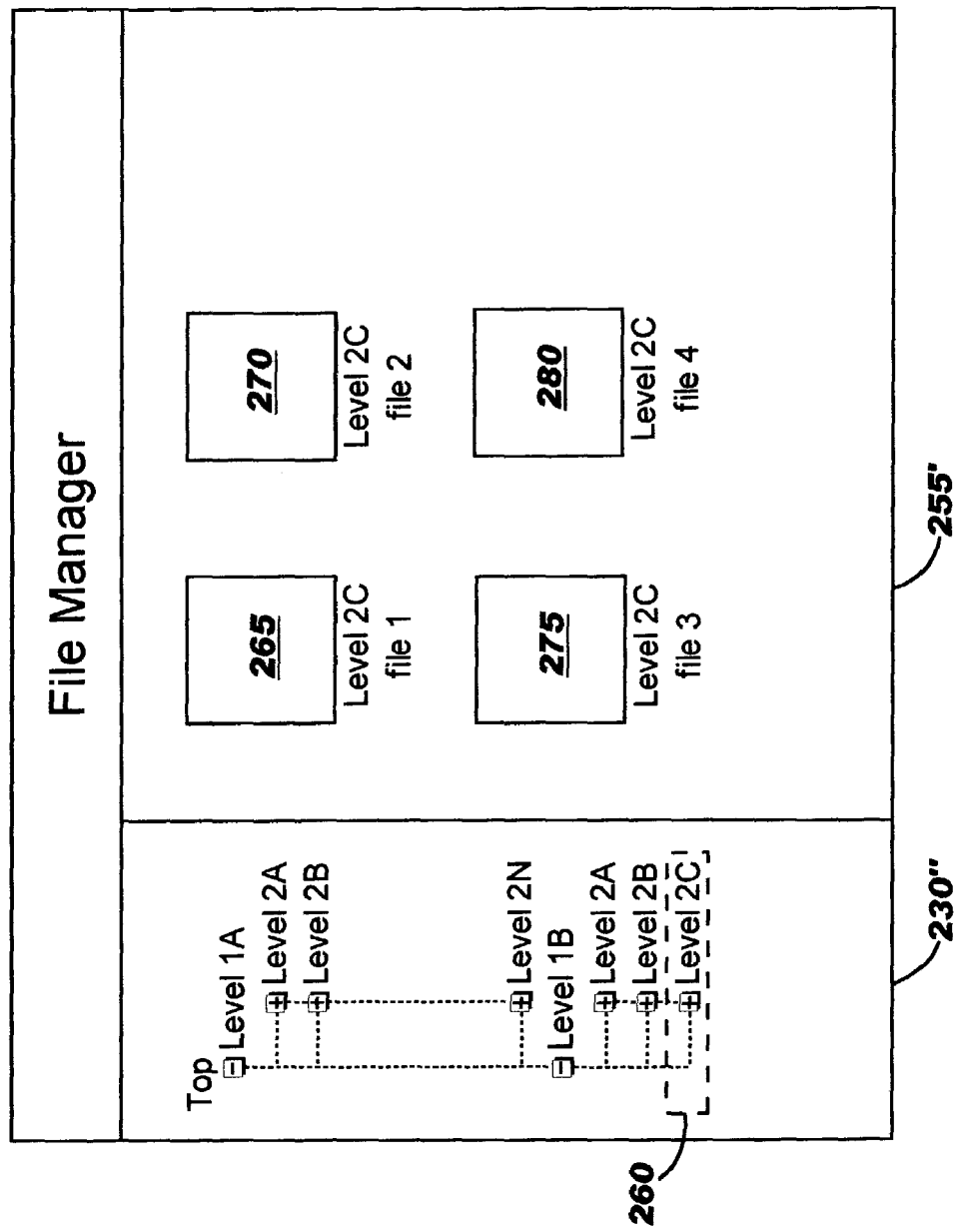

```
<SCRIPT lang="JAVASCRIPT"> reloadFrame('parent.frames["samplesWorkAreaFrame"].frames["samplesListFrame"]',
'/web-samples/samples/action/T2209db');

reloadFrame('parent.frames["samplesWorkAreaFrame"].frames["samplesContentFrame"]',
'/web-samples/samples/action/Tf04dae');

</SCRIPT>
```

FIG. 11

```
// Copyright IBM Corporation 2002. All rights reserved.

function reloadFrame (framePath, reloadURL)
{
  if (framePath != null && reloadURL != null) {
    var frame = eval(framePath);

//Determine if the function "frame.location.reload()" can be executed.
        // Check whether the reloadURL matches the end of the
        // frame's location.href (except for the anchor, if any).
        // If so, this is the case that certain browsers may ignore on
        // location.replace(), so set a flag to use location.reload(true)
        // instead.  This is done inside a try/catch block because
        // examining the location.hash and location.href may fail
        // if the location is a URL on another domain.

if (frame != null && frame.location != null) {
      var useReload = false;
      try {
        var hashLength = 0;
        if (frame.location.hash != null)
          hashLength = frame.location.hash.length;
        if (hashLength > 0) {
          var offset = frame.location.href.length - (hashLength + reloadURL.length);
          if ((offset >= 0) && (frame.location.href.indexOf(reloadURL) == offset)) {
            useReload = true;
          }
        }
      }
      catch(e) { }

//This is the main logic that performs frame reload on the browser.

if (useReload)
        frame.location.reload(true);
      else
        frame.location.replace(reloadURL);
    }
  }
}
```

METHOD AND SYSTEM FOR EFFICIENTLY PROCESSING MULTIFRAME DATA IN A CLIENT/SERVER COMPUTING ENVIRONMENT

BACKGROUND OF THE INVENTION

1. Field of the Invention

The present invention relates to client/server computing, and deals more particularly with techniques for more efficiently processing multiframe data for transmission to a client workstation, where the transmitted data may be rendered, e.g., displayed in one or more frames of a multiframe graphical user interface display on the workstation.

2. Reservation of Copyright

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

3. Description of the Related Art

The popularity of client/server computing has increased tremendously in recent years, due in large part to growing business and consumer use of the public Internet and the subset thereof known as the "World Wide Web" (or simply "Web"). Other types of client/server computing environments, such as corporate intranets and extranets, are also increasingly popular. As solutions providers focus on delivering improved Web-based computing, many of the solutions which are developed are adaptable to other client/server computing environments. Thus, references herein to the Internet and Web are for purposes of illustration and not of limitation. (Furthermore, the terms "Internet", "Web", and "World Wide Web" are used interchangeably herein.)

Millions of people use the Internet on a daily basis, whether for their personal enjoyment or for business purposes or both. As consumers of electronic information and business services, people now have easy access to sources on a global level. When a human user is the content requester, delays or inefficiencies in returning responses may have a very negative impact on user satisfaction, even causing the users to switch to alternative sources. Delivering requested content quickly and efficiently is therefore critical to user satisfaction.

Most modern computing applications render their displayable output using a graphical user interface, or "GUI". In a client/server computing environment such as the Internet, client software known as a "browser" is typically responsible for requesting content from a server application and for rendering the information sent by the server in response. Commonly, the displayed information is formatted as a Web page, where the layout of the Web page is defined using a markup language such as Hypertext Markup Language ("HTML").

The layout of a Web page may be defined as a single frame, or as multiple frames. The term "multiframe" is used herein to refer to Web pages that contain multiple frames. It should be noted, however, that use of multiple frames is not limited to Web pages: any type of GUI window may be divided into multiple frames. Thus, discussions herein of multiframe "pages" are provided for purposes of illustration but not of limitation, and these discussions should be construed as including the more general multiframe windows.

One common example of a multiframe display is a file manager window. A file manager window shows the directory structure of the files or objects stored on a storage device of a computer. Typically, the structure is presented using a hierarchical tree view in the leftmost part of a window, and the stored files or objects for a selected level of the hierarchy are presented in the rightmost part of the window. An example of this type of presentation is the Windows® Explorer application from Microsoft Corporation. ("Windows" is a registered trademark of Microsoft Corporation.) File manager windows are not typically designed as client/server applications. However, if an application of this type is used in a client/server environment, the directory structure may pertain to a remote file system. When the user selects an entry from the displayed hierarchy, the client application may cause the user's browser to send a request to a remote server, asking for details pertaining to that level of the directory (such as a list of the individual files and/or subdirectories of that level).

Another common example where a multiframe layout is used is in the display of publications that have a table of contents, where the table of contents is displayed in the leftmost part of a window and, when an entry in this table of contents is selected, the corresponding text is displayed in the rightmost window. In a client/server environment, the table of contents may be transmitted to the client browser initially for rendering in a Web page, and the user's selection of an entry from this display typically sends a new content request to the server from which the publication text is available. In this manner, the text can be incrementally retrieved.

These are examples of multiframe windows where the content of one frame is operably linked to another one of the frames. That is, the contents of the rightmost pane depend on a selection made by the user from the directory structure hierarchy or table of contents in the leftmost pane. This linking relationship among the frames of a multiframe window is not required in the general case, however, and many examples exist where the multiple frames simply provide a convenient organizational approach. For example, a company might design its Web presence so that all of the company's Web pages have a common structure, with a common heading and footer on each page. FIG. 1A shows an abstract example of this layout. In this example, the heading 100 and footer 120 areas of the Web pages may be designed as separate frames, with another frame (or perhaps multiple frames) being used for the body 110 of the pages. FIG. 1B shows a similar example, where a navigation frame 130 has been added. This navigation frame may be used to control what is displayed in the body of the page, using operable links between frames as described above with reference to file manager and table of contents frames.

Browser support for multiframe Web pages was made mandatory in Version 4.0 of HTML, and a vast number of multiframe pages have been created and deployed. While use of multiframe pages has a number of advantages, including design of content-rich Web pages, drawbacks exist in the manner in which these pages are redrawn (e.g., to refresh or revise the displayed content) on the user's workstation. In particular, when a browser requests a refresh for one frame of a multiframe page, there is no mechanism in the prior art for sending a response that supplies the requested content as well as content for only those other frames that are in need of redrawing. That is, while current technologies permit updating a single one of the frames or all of the frames, there is no prior art mechanism that provides for refreshing a subset of the frames.

It may be desirable to redraw or refresh a frame because of changes to previously-displayed data; because of asynchronous events out-of-band of the user's request (that is, changes that are not related to the user's request); in order to keep multiple frames synchronized (such as in the file manager and table of contents window examples, where selection of an entry from the leftmost window should be followed by a refreshing of the rightmost window); and so forth. (Hereinafter, the terms "refresh", "redraw", and "reload" are used synonymously when referring to redisplaying a frame or page.) Prior art mechanisms are for the server to respond by sending only the frame specifically requested by the browser, or to respond by sending the complete multiframe page including all of its contained frames (using, for example, procedural scripting code generated by the server to force reloading of the entire page); or, client-side logic such as an applet or special markup language syntax could be used.

As an example of using logic such as an applet on the client side, code may be written to iteratively poll the server for each frame in turn, thereby reloading each frame repeatedly (without regard to whether the frames need to be redrawn). As an example of using special markup language syntax to cause the client to request frame refreshes, the "META" tag construct may be used within a page encoded in HTML to specify a refresh interval and a Uniform Resource Locator ("URL") identifying the content to be refreshed. For example, the following META tag causes the rendering to be refreshed every 10 time units with content retrieved from the URL www.ibm.com:

<META HTTP-EQUIV="Refresh" CONTENT="10; URL=http://www.ibm.com/">

Each of these prior art approaches has drawbacks. When using the META tag markup language construct, if the URL that is specified to be refreshed is the page that is currently rendered at the workstation, the iterative refresh causes a continuous polling affect—i.e., retrievals that repeat at the refresh interval. (META tag syntax may be programmatically generated at the server to force this type of reloading, or in some cases, the META tag syntax may be statically defined in the page.)

If the server sends an entire multiframe page, even though some frames have not changed, this is an inefficient use of resources and may waste a considerable amount of network bandwidth. In addition, the time required to refresh the page may increase considerably, and "browser frame flashing" may occur due to multiple reloads of the same frame. Conversely, if the server sends only the requested frame regardless of other frames that may need refreshing, the displayed GUI may present stale or invalid information. A client-side polling solution introduces significant overhead on the client, leads to an inefficient use of server resources and network bandwidth, and causes unnecessary visual flicker as frames are repeatedly reloaded (many of which may have had no updates).

Accordingly, what is needed are improved techniques for processing multiframe data.

SUMMARY OF THE INVENTION

An object of the present invention is to provide improved techniques for processing multiframe data.

Another object of the present invention is to define techniques for more efficiently reloading multiframe pages.

Still another object of the present invention is to provide techniques for selectively refreshing multiple frames of a multiframe page.

Yet another object of the present invention is to enable transmitting content for a frame requested by a browser, as well as data to cause a refresh of other frames which were not explicitly requested, in a single response.

A further object of the present invention is to define techniques for refreshing multiframe displays in response to synchronous and/or asynchronous events.

An additional object of the present invention is to define techniques for asynchronously adding GUI objects to a GUI display.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for efficiently processing multiframe data in a client/server computing environment. In one aspect, this technique comprises: maintaining, at a server in the client/server environment, for each frame of a plurality of frames comprising a multiframe layout, an indicator corresponding to the frame, wherein the corresponding indicator indicates whether the frame needs to be loaded; and sending, in a message from the server to a client, (1) content corresponding to a particular one of the frames and (2) data for one or more other frames whose corresponding indicator indicates that the one or more other frames need to be loaded, wherein the data for the one or more other frames informs the client that the one or more other frames needs to be loaded.

Preferably, the message is sent from the server responsive to the server receiving a request from the client, and is for the content corresponding to the particular one of the frames.

The technique preferably further comprises receiving, at the client, the message sent from the server; and rendering within the multiframe layout, at the client, the content corresponding to the particular one of the frames. The technique may also further comprise sending, by the client to the server, a request for refreshed content for each of the one or more other frames, responsive to receiving the message and its data for the one or more other frames. In this case, the technique may also comprise: sending, by the client to the server, a request for refreshed content for each of the one or more other frames; receiving, at the client, subsequent messages sent by the server responsive to receiving the requests for refreshed content; and rendering within the multiframe layout, at the client, content corresponding to the one or more other frames, wherein the content is received in the subsequent messages. The renderings may be, for example, visual renderings.

The data for the one or more other frames may be specified with procedural scripting code, and the content is preferably encoded in a markup language (such as HTML).

A frame may need to be loaded (and therefore, its corresponding indicator may be set) because of change to content of the corresponding frame, because of change to content of a related frame, and/or because of asynchronous processing at the server. The technique preferably further comprises determining, prior to sending the message, each frame of the multiframe layout that needs to be loaded, and then sending the data for each determined frame.

A reference to each frame that needs to be loaded in the multiframe layout is preferably queued at the server. The queued references may then be processed to identify the one or more other frames, prior to sending the message. In preferred embodiments, the references may be queued and then superfluous references are subsequently deleted. Also, for each frame having a queued reference, earlier-queued references to its descendent frames are preferably deleted as being superfluous. In alternative embodiments, the queuing is suppressed for frames that have an already-queued reference. Preferably, the content corresponding to the particular one of the frames is minimized when sending the message to the client if an ancestor of the particular one has a queued reference.

Optionally, the message sent from the server to the client may contain an indication of one or more graphical user interface objects to be rendered at the client, in addition to or instead of the data for the one or more other frames.

The present invention will now be described with reference to the following drawings, in which like reference numbers denote the same element throughout.

BRIEF DESCRIPTION OF THE DRAWINGS

FIGS. 2A–2C depict an example file manager window that uses multiple frames, and are used to illustrate operation of preferred embodiments of the present invention;

FIG. 11 provides sample code that may be invoked to selectively refresh frames, responsive to invocation syntax such as that shown in FIG. 9.

DESCRIPTION OF PREFERRED EMBODIMENTS

Figure 1A:
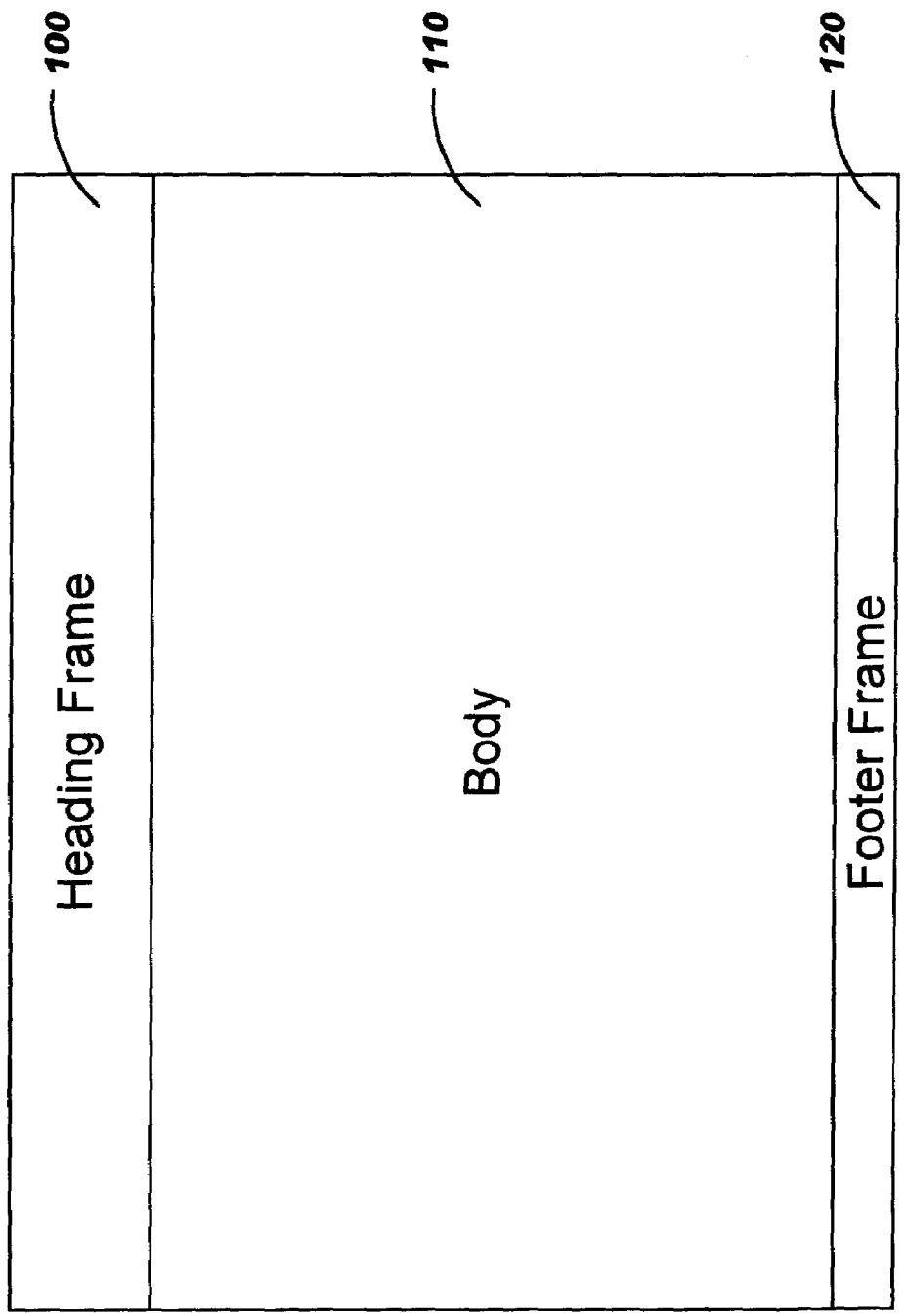
FIGS. 1A and 1B provide sample Web page layouts using multiple frames, according to the prior art.
Figure 1B:
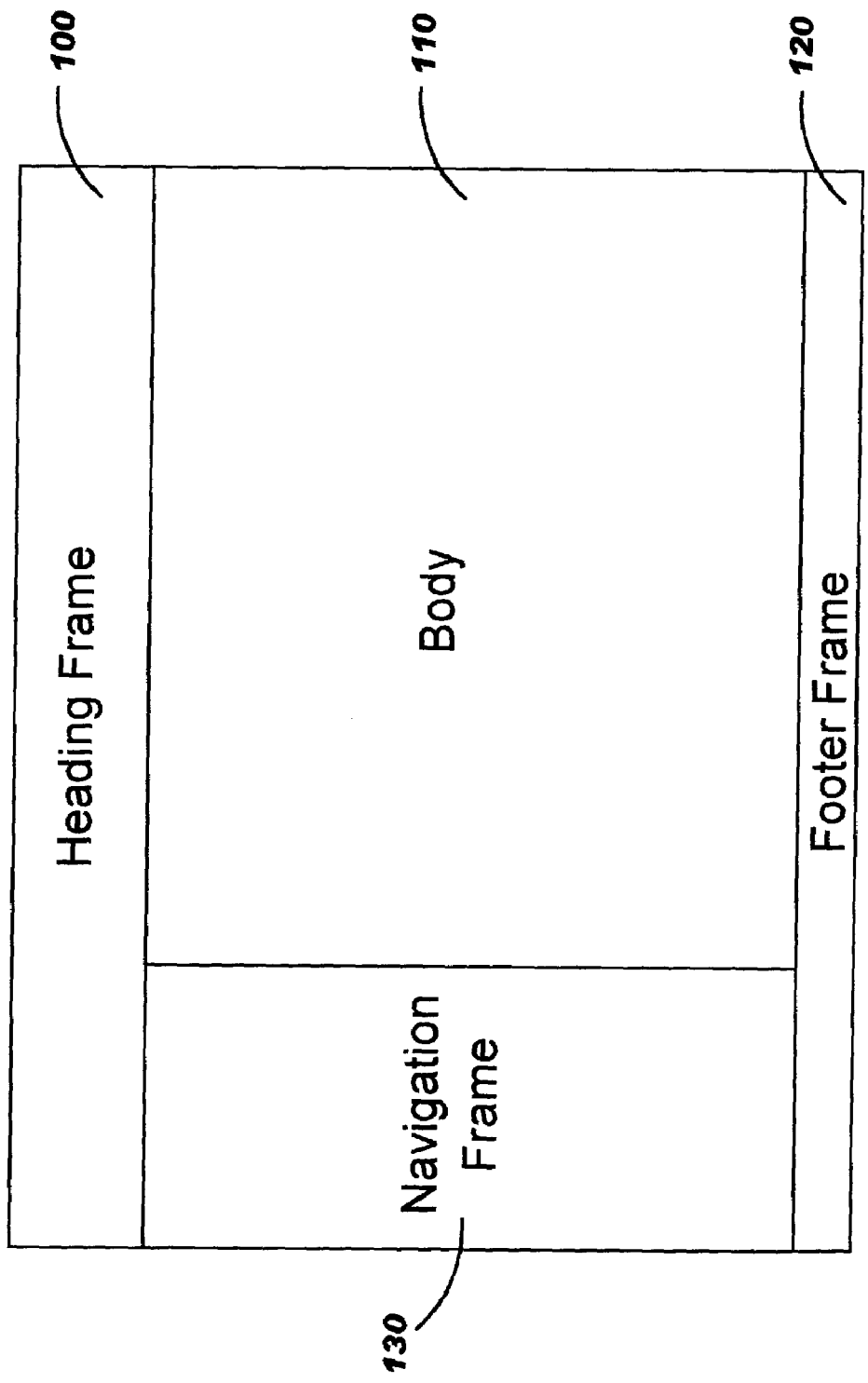

The present invention provides novel techniques for efficiently loading frames of a multiframe Web page or a multiframe window. Multiple frames may be loaded as a result of the server sending its response to a single client request message. Server-side logic maintains an awareness of which frames need loading, regardless of whether changes to those frames are synchronous with the client's request for a frame or asynchronous to that request. Then, when the client requests data for a single frame, in addition to sending content for the requested frame, the server also sends data to refresh the other frames that need loading (referred to equivalently hereinafter as "changed frames"). In preferred embodiments, the data to refresh the other changed frames comprises indicators that will force the client browser to request loading of each changed frame. More particularly, the data to refresh content is preferably a script attached to the server's response, where this script is encoded in a procedural scripting language (such as the Javascript® language; "Javascript" is a registered trademark of Sun Microsystems, Inc.). Data to refresh content of the unchanged frames is not sent, however, and thus the selective frame loading approach of the present invention uses bandwidth more efficiently and redraws pages more quickly than prior art multiframe reloading techniques. Preferred embodiments also collapse multiple reloads for a frame into a single response, resulting in further efficiencies in transmission. The disclosed techniques avoid the unnecessary flashing or flickering of browser frames that occurs with prior art approaches. No additional client-side logic is required.

As an example of using the present invention for processing asynchronous frame displays, the client may have requested an update to one frame, while the server-side logic may have detected a need to display a message box or other GUI object on the client GUI (irrespective of which frame the client requested). The message box information can then be delivered to the client, along with the requested content. This asynchronous display mechanism can be used to present a frame to the user without regard to whether that frame is currently visible to the user, or whether a frame for the GUI object currently exists. (Asynchronous displays may also pertain to frames that are currently visible, for example when processing in the server-side business logic impacts the content of a different frame that is rendered within the same ancestor page or window as the frame requested by the client. Asynchronous changes may be the result of daemons or other server-side thread processing that impacts frames or objects in application-specific ways. For example, a particular application might display status information in a frame, and the frame may therefore need periodic refreshing even if the client does not explicitly request a refresh.)

According to preferred embodiments, elements of the server-side logic register as a listener for particular events. When the event occurs, a notification is automatically sent to all registered listeners. (Mechanisms for registering as a listener and for sending and receiving notifications upon occurrence of an event are known in the art, and prior art techniques are preferably leveraged by embodiments of the present invention.) One of the listeners that will register for updates from business logic is the frame associated with the view for that business logic. When the business logic changes the frame content, the frame receives an update event and thus knows that it needs to be redrawn. The manner in which the listeners respond to events will be described in more detail below, with reference to the example file manager of FIGS. 2A–2C.

Preferred embodiments use a status indicator (such as a binary flag or binary-valued property) for each frame of a multiframe page, to indicate whether the frame's contents have been modified since the most recent frame reload was sent to the client. Thus, when the business logic causes a change to the content for the frame, the status indicator is set. Alternatively, the indicator may be set for other reasons that necessitate reloading the frame. The status indicator is also referred to herein as a "dirty bit", and setting the dirty bit is referred to equivalently as marking the frame as a "dirty frame".

A queue of dirty frames is used in preferred embodiments to optimize the frame reloading process. When a frame is dirty, a reference to the frame is placed on the reload queue. When a frame refresh request arrives from the client, the entries on the queue are evaluated to determine whether other frames need to be refreshed. In this manner, a demand-driven approach is provided that results in refreshing only the changed frames. (In preferred embodiments, the dirty frame references are all queued, and any duplicate/redundant entries are eliminated by processing the queue at a later time, such as upon receiving a client's refresh request. This processing is discussed below with reference to FIGS. 7 and 8. In alternative embodiments, the queue entries may be scanned before queuing a reference to a dirty frame, and if an earlier-queued reference to this frame is found, then the frame reference will not be queued again—because only one reference is needed to cause the frame's current contents to be retrieved upon the next refresh request. However, it should be noted that this alternative approach may result in decreased efficiency. For example, it may happen that the user moves to a different Web page, in which case the queued frame references may be discarded. The queue scanning overhead is wasted processing in this case.) Because multiple frame updates are consolidated into a single queued frame reference in preferred embodiments (and into a single refresh indicator, after processing the queued references in alternative embodiments), frame flicker at the receiver is greatly reduced, and use of bandwidth is more efficient. Preferred and alternative embodiments also preferably optimize the queue processing and frame reloading by leveraging the parent-child relationship among nested frames. That is, once a frame reference for a parent (or more generally, ancestor) frame has been queued, any earlier-received frame references for the child (or more generally, descendent) frames are superfluous because reloading the parent/ancestor will automatically reload the child/descendent. Thus, removing the frame references for these child/descendent frames from the reload queue further reduces frame flicker and further optimizes use of bandwidth.

It should be noted that the dirty bit for a frame may be set by processing that is asynchronous to a client browser's request for a frame refresh (of that frame or another frame). Thus, references to frames may be added to the reload queue as a result of these asynchronous changes, and these queued references may be processed when a client browser's refresh request arrives.

Once a dirty frame is refreshed, its "dirty bit" is reset (in effect, marking the frame as "clean"). The present invention uses a server-side component referred to herein as a "frame reload manager" to, inter alia, process the queue of dirty frames. The frame reload manager listens for changes in the dirty bit, and upon being notified of a reset for a particular frame, it removes any queued references to that frame from the reload queue.

Figure 2A:
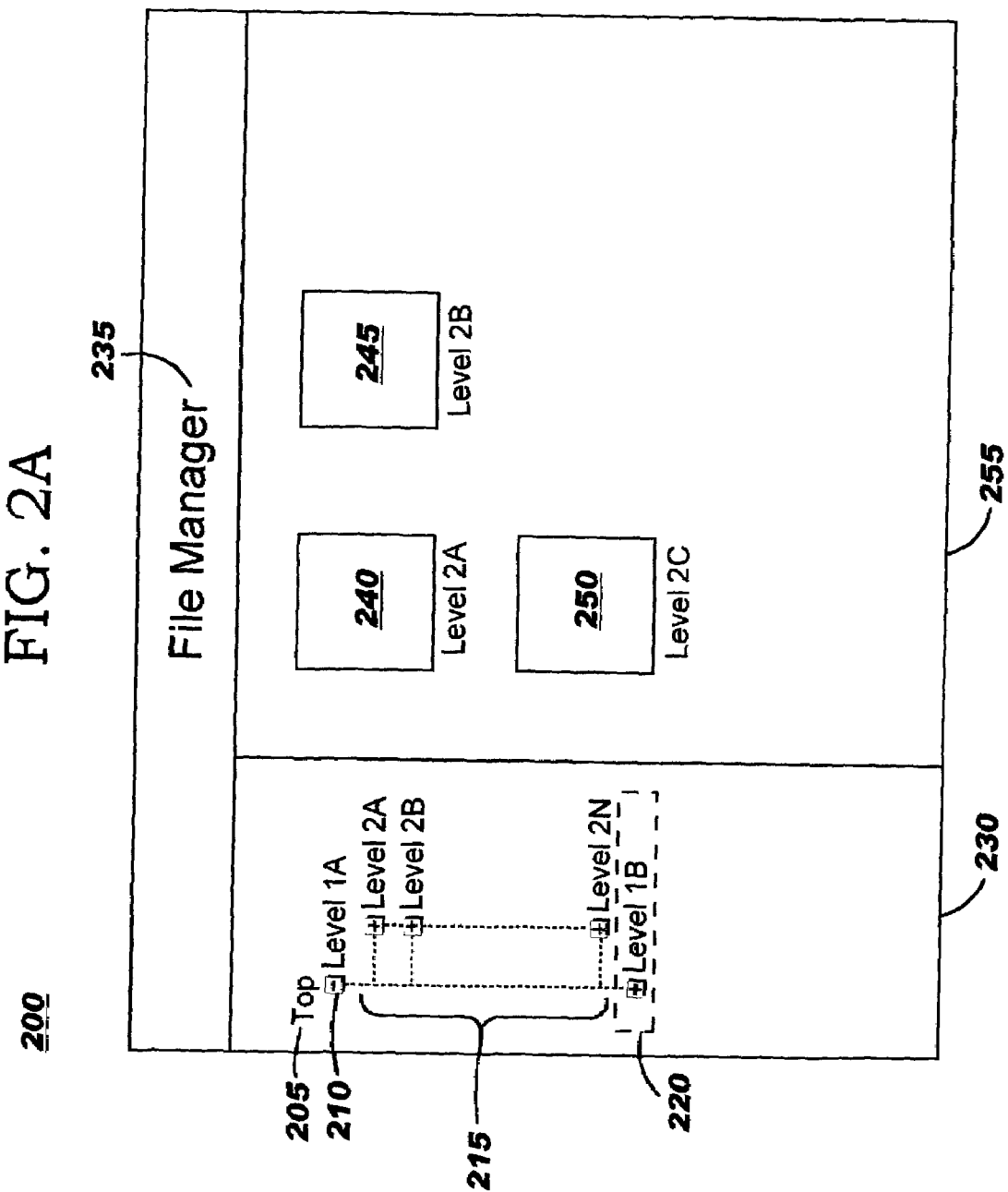

Preferred embodiments will be described with reference to the example multiframe page in FIGS. 2A–2C. The example file manager display 200 has a left frame 230 for displaying the hierarchical structure of a remote file system, and a right frame 255 for displaying the files or objects stored at a selected level of the file system structure. The title 235, "File Manager", may be displayed in a separate frame. In FIG. 2A, a topmost level designated as "Top" 205 appears first (for purposes of illustration), and this topmost level has 2 child elements or nodes designated as "Level 1A" 210 and "Level 1B" 220. "Level 1A" 210 is shown in an expanded state (denoted by the "−" sign in the graphic to the left of the element name), having "N" child elements designated as "Level 2A", "Level 2B", . . . through "Level 2N" (shown generally at 215). "Level 1B" 220 is shown in an unexpanded state (denoted by the "+" sign in the graphic to the left of the element name), and is shown as having been selected (denoted by the dashed rectangle surrounding the element name, which in this example represents highlighting). In the example of FIG. 2A, the right contents frame 255 shows that Level 1B 220 contains 3 objects named "Level 2A" 240, "Level 2B" 245, and "Level 2C" 250.

Now suppose that the user decides to expand the hierarchical display for Level 1B 220. This is shown in FIG. 2B, where the "+" sign graphic at 220 is now changed to a "−" sign graphic at 220', and 3 child elements "Level 2A", "Level 2B", and "Level 2C" are shown in the expanded information at 225. Expanding Level 1B 220 does not cause a change to the right frame 255, and the 3 objects 240, 245, 250 displayed therein are therefore unchanged from FIG. 2A. Thus, an embodiment of the present invention marks only the left frame as dirty, and assuming there are no asynchronous changes that result in marking the other frames as dirty frames, only the left frame contents as shown in 230' will be transmitted to the client browser in response to the expansion request.

Figure 2B:
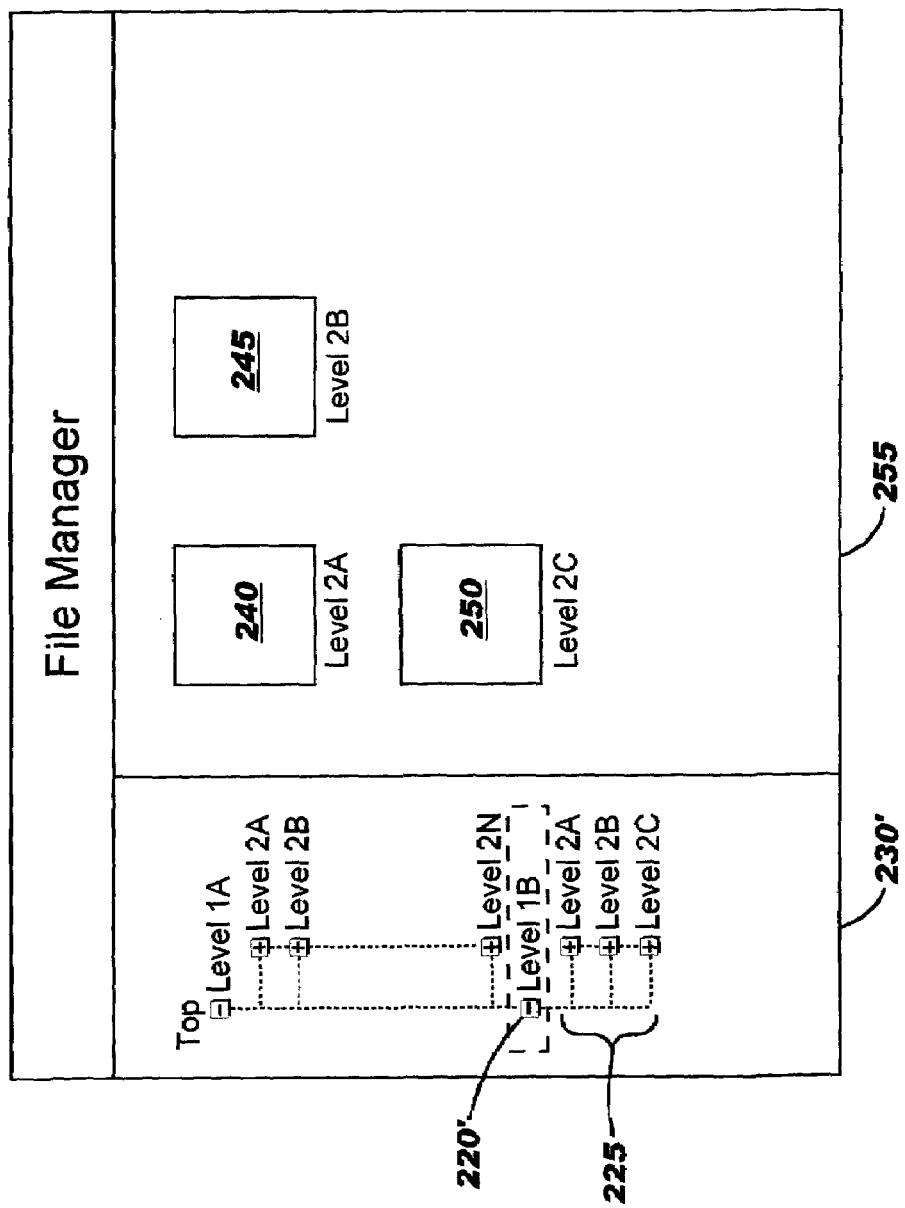

Suppose the user then selects the last of the 3 displayed elements at 225 from the display in FIG. 2B, indicating that he would like to see the stored files and objects of Level 2C. Typically, highlighting will be applied to the rendered display, as indicated by the dashed rectangle surrounding the element name at 260 of FIG. 2C. This highlighting is a change to frame 230', and thus embodiments of the present invention mark the left frame dirty. When redrawn, the left frame appears as shown in revised frame 230" of FIG. 2C. The semantics of the user selecting an element from the left frame require the right frame to be updated, in this example, and thus the stored objects from Level 2C 260 are located and graphic representations thereof (265, 270, 275, 280) are to be drawn in revised frame 255'. Therefore, the right frame will also be marked as a dirty frame by embodiments of the present invention. The client request therefore results in sending the new content shown in frame 230", along with an indication (preferably, procedural scripting code) that the browser should send a subsequent refresh request to retrieve the new content shown in frame 255' of FIG. 2C.

Use of the present invention therefore allows both changed frames 230", 255' to be efficiently reloaded in the node selection scenario of FIG. 2C, while only the single changed frame 230' is reloaded in the node expansion scenario of FIG. 2B. Note that in neither case is the title frame updated, since the title has not changed. As will be obvious, in cases where there are a larger number of frames within the multiframe page than in the simple example of FIGS. 2A–2C, the selective reloading of frames as disclosed herein is even more advantageous.

Turning now to the flowcharts in FIGS. 3–8, logic which may be used to implement preferred embodiments will now be described. This logic will be described with reference to the example file manager application of FIGS. 2A–2C, but its extension to other applications will be readily apparent to those of ordinary skill in the art.

In a multiframe HTML environment, the content to be rendered in each frame is independent from the content of other frames. That is, the content in each frame is typically an HTML document, and this document is identified by specifying a source ("src") attribute on the frame tag, where the value of this attribute is the document's address. The present invention uses the frame reload manager to unify the documents within the multiframe layout, such that multiple documents can be efficiently reloaded in the corresponding frames in response to the client's original request. The frame reload manager can determine the hierarchical relationship between frames, for example by determining a particular frame's child frames and/or parent frame, or more generally the descendent and ancestor frames of a particular frame.

Figure 3:
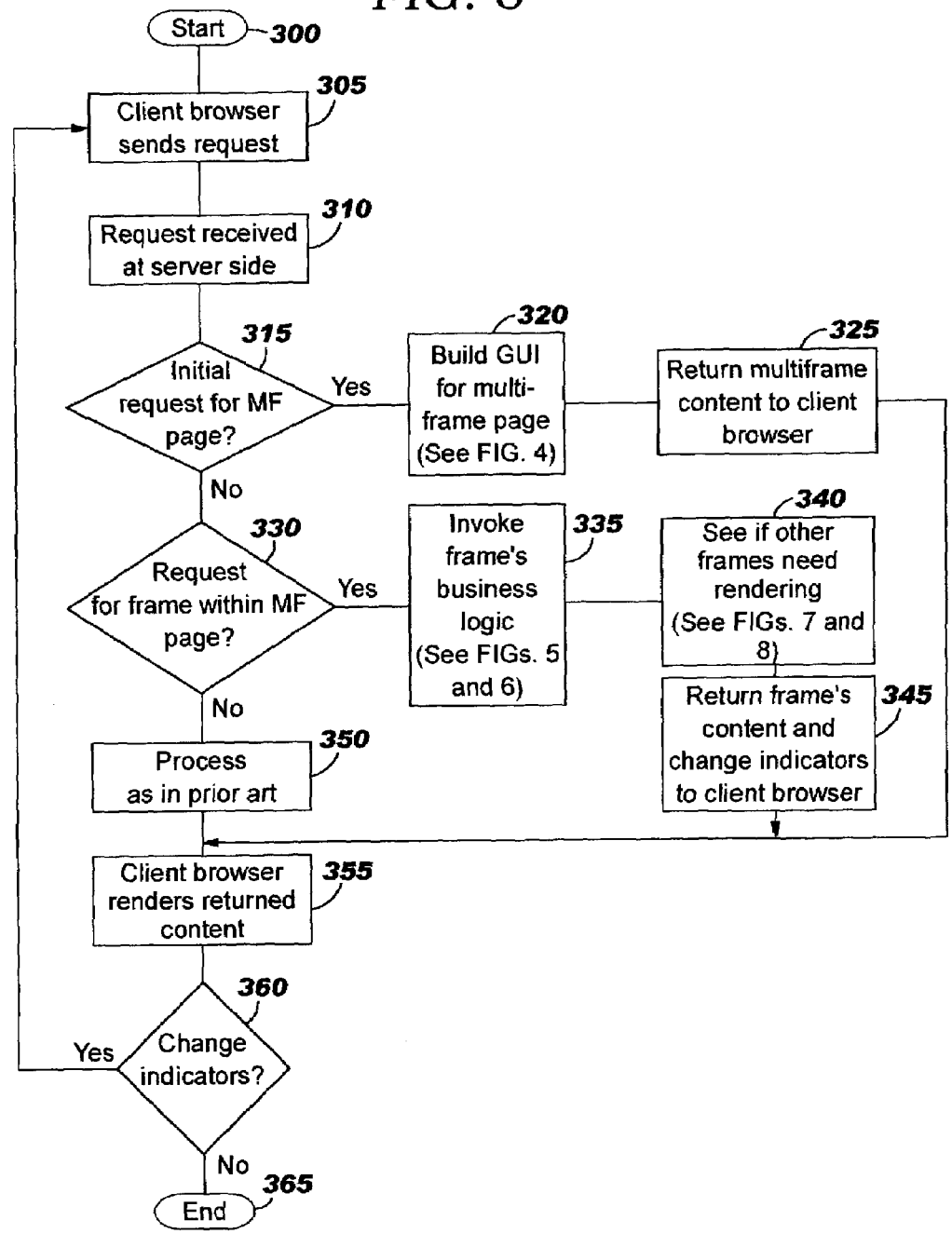
FIGS. 3–8 provide flowcharts of logic used by preferred embodiments to efficiently load a multiframe page, with reference to the file manager example of FIGS. 2A–2C.

FIG. 3 illustrates processing of preferred embodiments at a high level, and starts (Block 300) when a client browser sends a content request (Block 305). When the server receives this request (Block 310), it checks to see if this is the initial request for a multiframe ("MF") page (Block 315) in a session with the user. If so, then Block 320 builds the GUI for this multiframe page, as described in more detail with reference to FIG. 4. (This "yes" path from Block 315 is taken only for each new session with the user. Accordingly, a new instance of Frame Reload Manager is created for each user session; see Block 410 of FIG. 4. That instance will then be used for all subsequent requests for the entire user session, which will follow the "no" path from Block 315.) The multiframe content is then returned to the client browser (Block 325), after which the client browser typically renders the returned content (Block 355).

If this is not the initial request for a multiframe page, then Block 330 checks to see if the client's request was for content of one of the frames within a multiframe page. If this test has a positive result, Block 335 invokes the requested frame's business logic, as described in more detail with reference to FIGS. 5 and 6. Subsequently, Block 340 checks to see if other frames (or other GUI objects) need to be rendered. This process is described in more detail with reference to FIGS. 7 and 8. The content for the requested frame (irrespective of its change indicator), along with change indicators for the other frames/objects to be rendered, is then returned to the client browser (Block 345). Preferably, these "change indicators" (which are also referred to herein as "data to refresh content") comprise procedural scripting code (expressed in Javascript, for example) that will signal the client to subsequently request content for each frame/object identified therein. Refer to the description of FIGS. 9 and 10, below, for an example of how these change indicators may be encoded for frames of a sample multiframe page. (For ease of reference, discussions herein are primarily in terms of rendering frames, although the disclosed techniques may also be used for rendering objects, as stated earlier. Furthermore, it may happen that the server-side logic requests rendering of one or more frames that have not been previously rendered. Thus, references herein to "refreshing" or "reloading" frames should be interpreted as including the scenario where the frame is initially loaded.)

As an optimization performed by preferred embodiments of the present invention, when the content of the requested frame is formatted for returning to the client (Block 345, above), that content may be generated as an empty frame or a minimal-content, placeholder frame (having, for example, a simple "Loading . . . " message). This optimization is preferably used when change indicators will be sent to the requester to load an ancestor of the requested frame. Because the frame requested by the client must be returned, according to standard Hypertext Transport Protocol ("HTTP") procedures, this optimization reduces the bandwidth required for returning that frame when it is known that the frame will be overlaid upon the subsequent rendering of its ancestor. In addition, this optimization improves response time and may eliminate some frame flicker that results from reloading the same content twice. (See also the discussion of Blocks 725 and 750 of FIG. 7, below, where a decision to optimize the transmission in this manner is discussed.)

If the client's request is not the initial request for a multiframe page or a request for a frame within a multiframe page, then the request may be processed as in the prior art (Block 350). That is, the requested content is located by the server and returned to the client for rendering. Alternatively, embodiments of the present invention may perform the processing illustrated in FIGS. 7 and 8 to determine whether the client should be notified of other frames (or other GUI objects) that the server-side business logic has determined should be rendered; in this case, when the requested content is returned, it is preferably accompanied by change indicators such as the procedural scripting code that will signal the client to issue further content requests.

After the client renders the returned (i.e., requested) content at Block 355, Block 360 indicates that, according to preferred embodiments, the client will process any change indicators that were included therewith by returning control to Block 305 and issuing requests for the identified frames/objects. If there are no more change indicators to be processed, then control reaches Block 365 and the processing for this request then ends.

Figure 4:
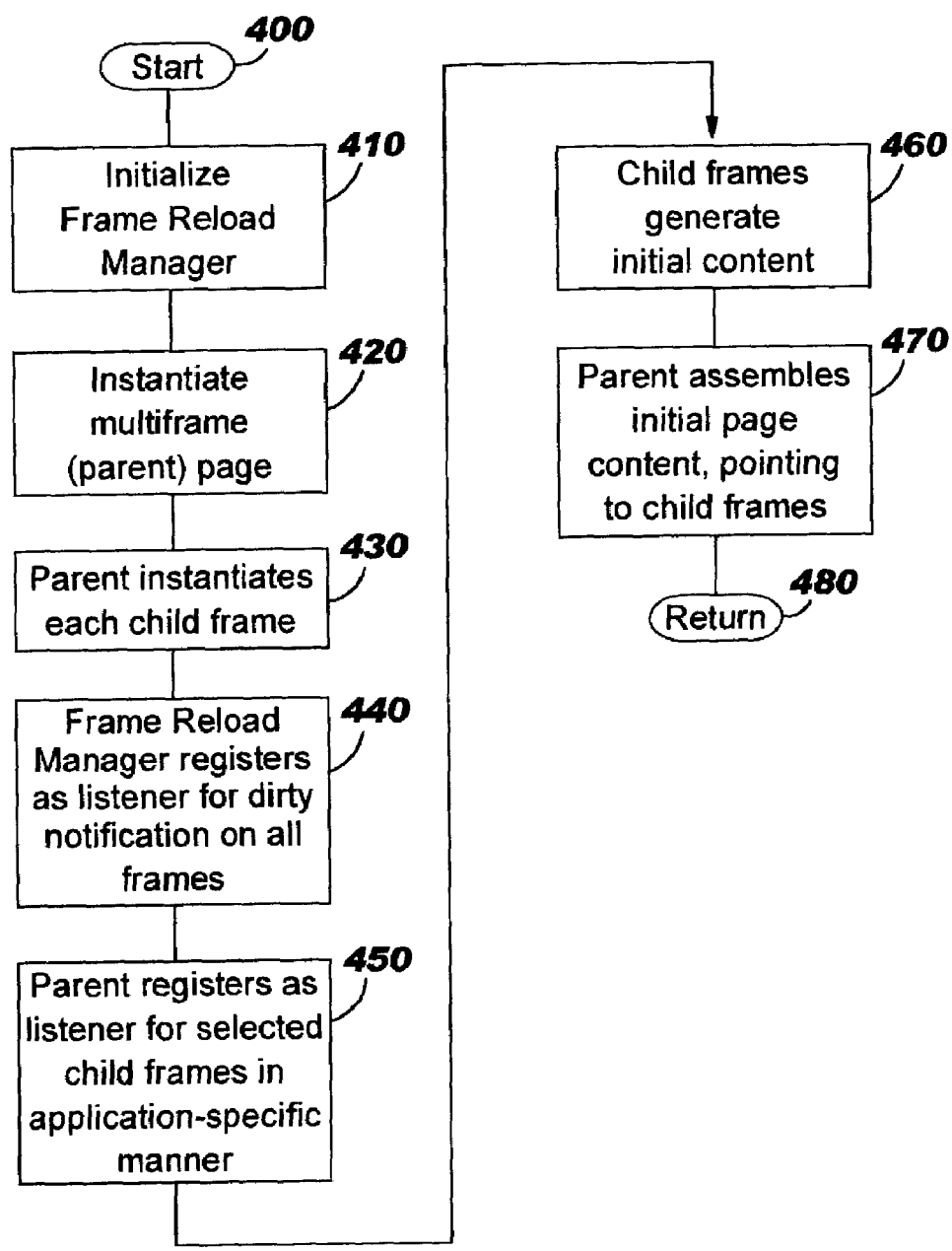

FIG. 4 depicts logic that may be used to initially build the GUI for a multiframe page, and the processing therein begins (Block 400) upon invocation from Block 320. Block 410 initializes the frame reload manager component. This initialization comprises creating a frame reload queue.

A server-side collection of frame hierarchies is maintained in preferred embodiments, where this collection comprises a definition of the hierarchy for each multiframe page. In this manner, the frame reload manager can efficiently determine ancestor/descendent relationships among frames. When more than one such hierarchy is defined, the collection comprises a forest of trees. (Refer to the discussion of FIGS. 10A and 10B, below, for an example of a multiframe hierarchy for a particular multiframe page.) Accordingly, Blocks 420 and 430 instantiate a new hierarchy for the current multiframe page. In Block 420, the multiframe page (which is a parent page comprising a number of child frames) is instantiated. Preferably, the parent then instantiates each child frame (Block 430). One or more of these child frames may have child frames of their own, and the processing for these (grandchild frames is recursive (and is analogous to the processing of Blocks 430–470).

In Block 440, the frame reload manager registers as a listener on the dirty bit (i.e., for setting and for resetting of this bit) for all frames. (That is, all frames are being listened to, and what the frame reload manager is listening for is changes to the dirty bit.) The parent frame may also register, as indicated in Block 450, as a listener for selected child/descendent frames, in an application-specific manner. In addition, child/descendent frames may register as listeners for other frames (including their sibling frames) in an application-specific manner. For example, in the file manager example described earlier with reference to FIGS. 2A–2C, the rightmost frame preferably registers as a listener for selection events in the leftmost frame (because the selection will typically result in changed content that needs to be displayed in the rightmost frame), but does not need to register as a listener for expansion events in that frame (because the expansion of a tree node in the leftmost frame does not result, in this example, in updated content for the rightmost frame).

Each of the child frames preferably generates its initial content (Block 460), after which the parent frame assembles the initial page content (Block 470), having pointers to each of the child frames. Control then returns (Block 480) to the invoking logic.

Figure 5:
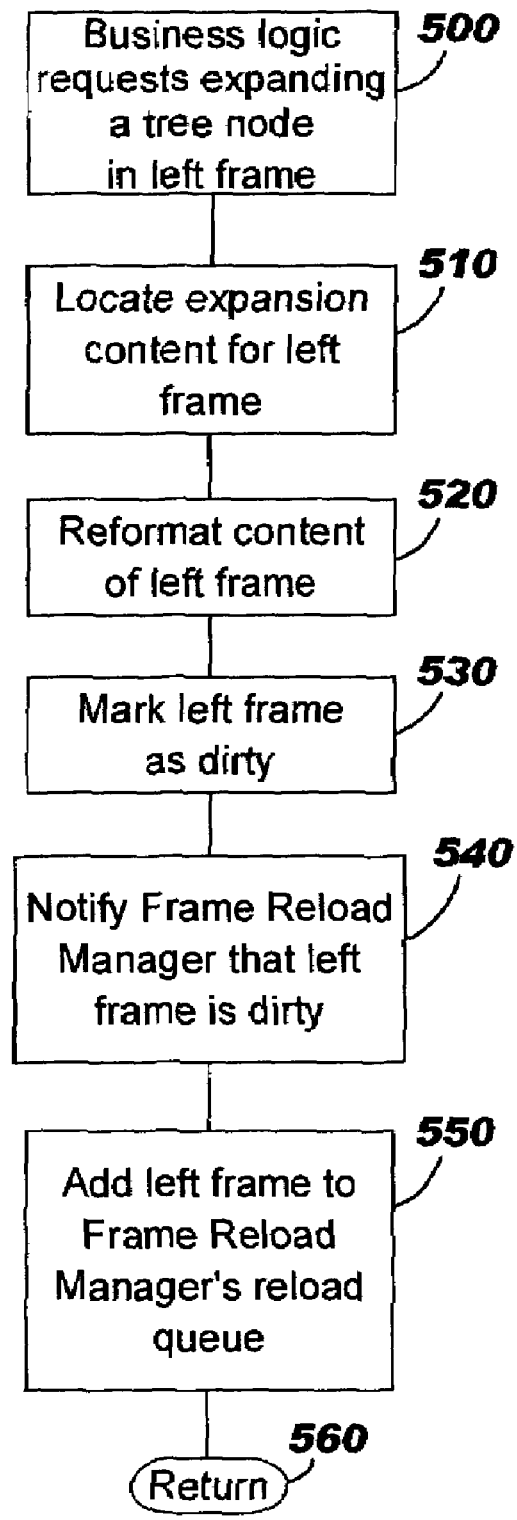
Figure 6:
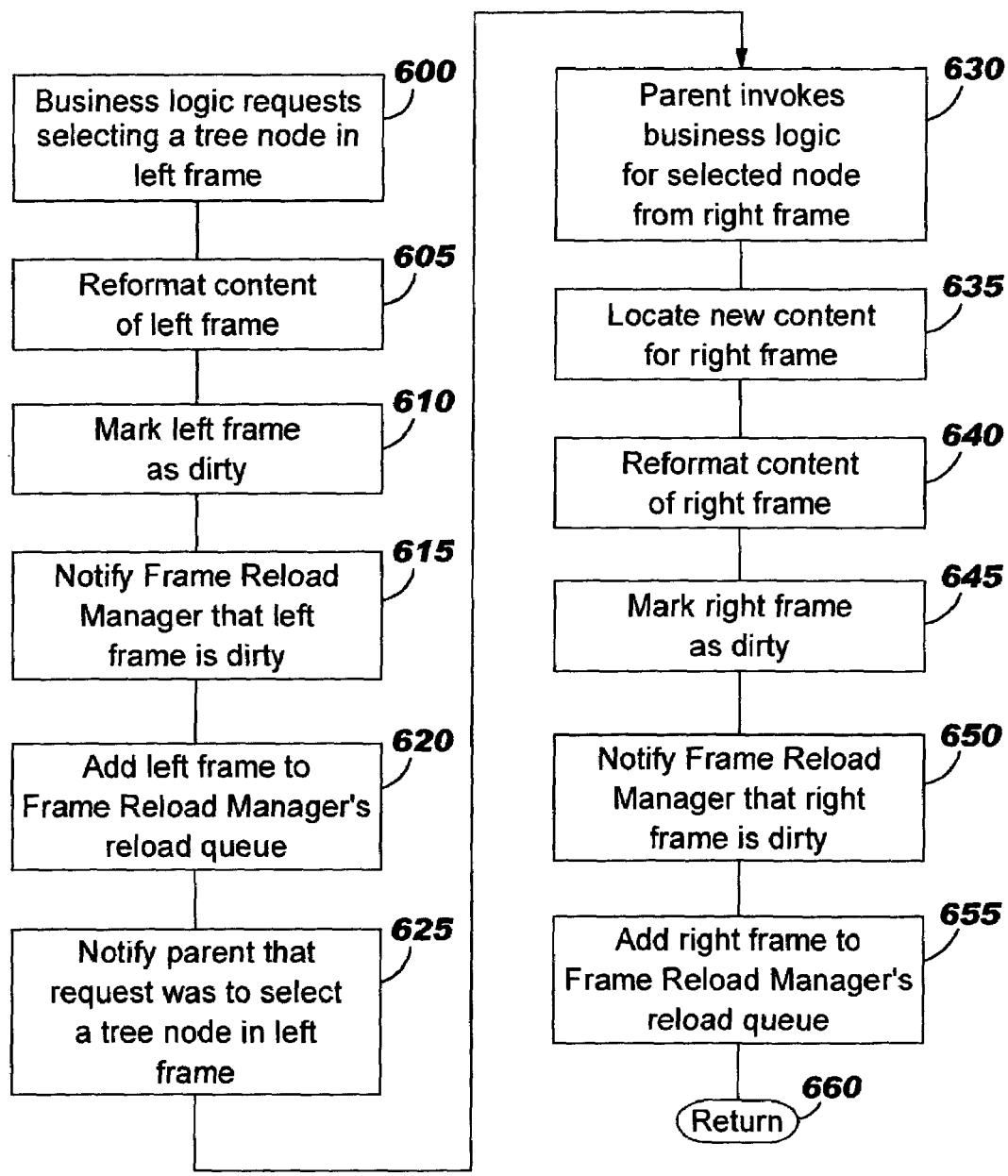

FIGS. 5 and 6 depict logic that may be used in the file manager example in its processing to selectively refresh (or initially load, as stated earlier) frames, according to the present invention. This logic includes determining which frames are to be marked as dirty frames, marking them, and queuing references to the dirty frames. As will be obvious, the logic in these figures is a representative example. In the general case, the following scenarios may happen:

1. The business logic for the currently-loading frame does not mark any other frames as dirty frames.
2. The business logic for the currently-loading frame results in a different frame (such as a sibling frame)

being marked as a dirty frame. (Note that more than one such frame may be marked as a dirty frame.)
3. The business logic for the currently-loading frame marks the parent/ancestor frame as dirty.
4. The business logic for the currently-loading frame marks one or more child/descendent frames as dirty frames.
5. Asynchronous processing may result in one or more frames being marked as dirty frames.

According to the present invention, scenario 1 results in loading only the current frame, and scenarios 3 and 4 result in loading the outermost (i.e., ancestor) frame and all of its descendent frames. (Note than in both scenarios 3 and 4, an ancestor frame will be loaded. In scenario 3, this is the ancestor of the currently-loading frame. In scenario 4, the currently-loading frame becomes the outermost frame of multiple nested frames to be reloaded, by virtue of having dirty descendent frames, and thus this currently-loading frame is also an ancestor frame to be loaded. Refer to the discussion of FIGS. 7 and 8, below, where the applicable processing is described.) Scenario 2, where one or more "different" frames are marked as dirty, is illustrated by the file manager example where certain changes to the leftmost frame (namely, a selection event, in this example) cause the rightmost frame to need refreshing. Thus, the rightmost frame is therefore marked as a dirty frame, enabling selectively refreshing this frame upon receiving a request to refresh the leftmost frame, according to preferred embodiments of the present invention. Logic for implementing this scenario is shown in FIGS. 5 and 6. Scenario 5 is similar to scenario 2, but some thread other than the one processing the business logic for the currently-loading frame does the marking. From these figures, it will be obvious to one of ordinary skill in the art how logic for the other scenarios may be implemented.

FIG. 5 provides logic for handling a request by the business logic to expand a node of the tree in the leftmost frame, as indicated in Block 500, responsive to receiving the client's node expansion request at Block 330 of FIG. 3. The specific content to be rendered in the frame, responsive to the particular node to be expanded, is located (Block 510), and the content of the frame is then formatted accordingly (Block 520). Because the frame was requested by the client browser, it must be returned to the requester because of standard HTTP processing, as stated earlier. However, preferred embodiments also mark the frame as dirty and queue a reference to the frame on the reload queue, to optimize the use of bandwidth when transmitting to the client browser. Accordingly, the frame's dirty bit is set (Block 530). The frame reload manager is therefore notified that the left frame is dirty (Block 540). Preferably, this notification occurs automatically, due to the frame reload manager being a registered listener for changes to the frame's dirty bit. A reference to the dirty frame may be added to the reload queue (Block 550). Note that this frame reference will subsequently be removed, according to preferred embodiments, as being a duplicate of the initially-requested frame, which will automatically be returned to the requester as part of standard HTTP processing. (In the general case, as has been discussed, frame references that are queued may be subsequently eliminated if other references to the frame or references to an ancestor frame are on the reload queue. Or, in alternative embodiments, such frame references may be suppressed by evaluating the queued references prior to queuing a new reference, as has also been previously discussed.) Control then returns (Block 560) to the invoking logic.

The logic in FIG. 6 handles a selection request from the business logic for a node of the tree in the leftmost frame, as indicated in Block 600, responsive to receiving the client's node selection request at Block 330 of FIG. 3. The content of the frame, responsive to this selection request, is then formatted accordingly (Block 605). Because the left frame has changed (e.g., the highlighting used to show which node is selected will apply to a different node), it needs to be reloaded, and its dirty bit is therefore set (Block 610). Accordingly, the frame reload manager is notified that the left frame is dirty (Block 615), and a reference to the dirty frame may be added to the reload queue (Block 620). Refer to the discussion of Blocks 540 and 550 of FIG. 5, above, for more detailed information.

In this example, selecting a node from the tree results in notifying the parent frame, as indicated in Block 625, and the parent then invokes business logic to cause information for the selected node to be displayed in the right frame (Block 630). That business logic locates the new content for the right frame (Block 635), for example by querying the operating system of a remote computer to identify the files or other objects stored at the selected level of a hierarchical file system. The right frame is then formatted accordingly, to render this new content (Block 640). Because the content of the right frame has changed, it needs to be reloaded, and its dirty bit is therefore set (Block 645). The frame reload manager is therefore notified that the right frame is dirty (Block 650), and a reference to the dirty frame may be added to the reload queue (Block 655), as discussed in detail with reference to Block 550 of FIG. 5. Control then returns (Block 660) to the invoking logic.

As will be obvious, the processing of FIGS. 3–6 has been simplified to omit operations which are known in the art (such as how frames and views are instantiated and revised), for purposes of better illustrating the novel concepts of the present invention.

Figure 7:
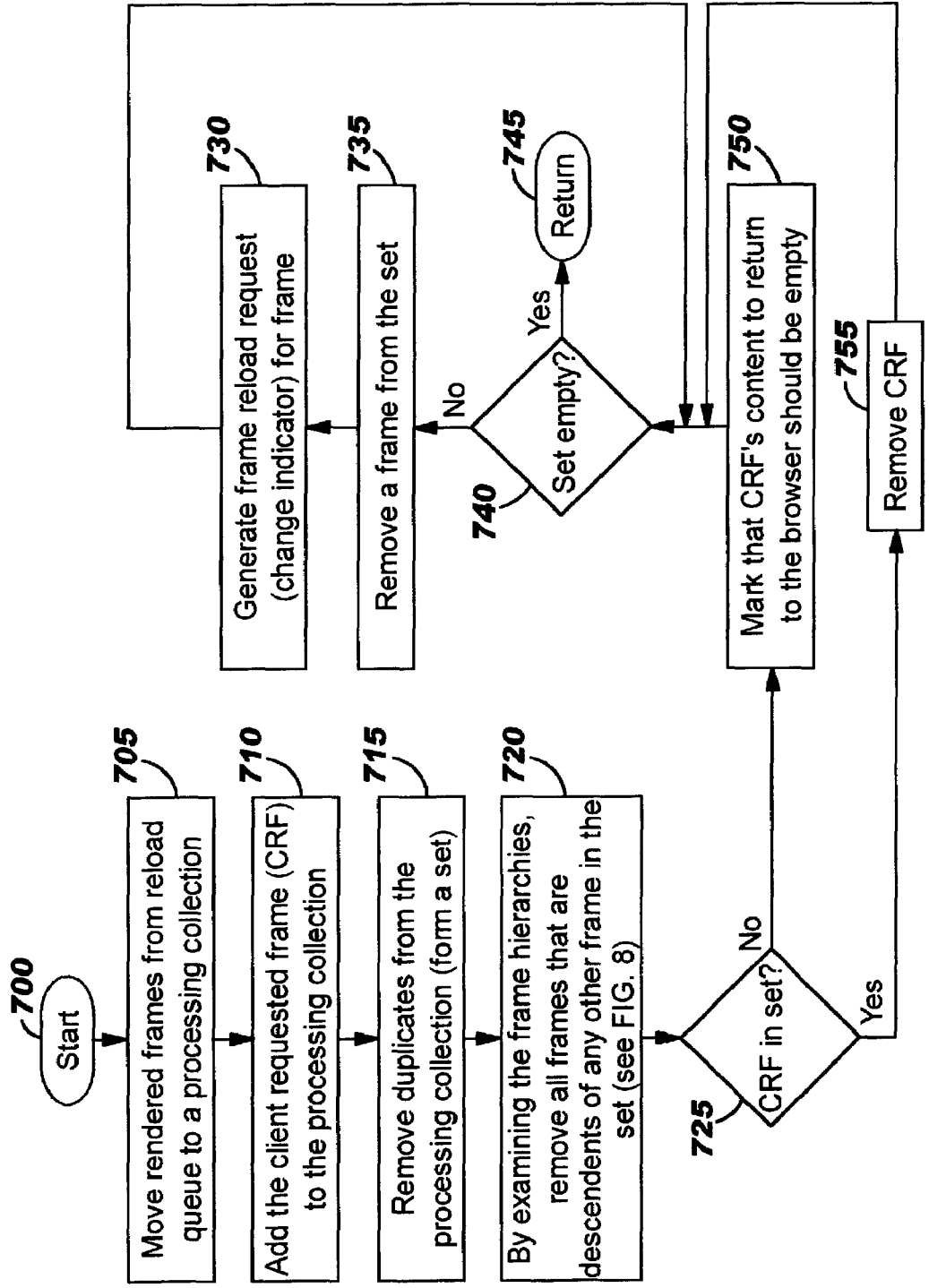
Figure 8:
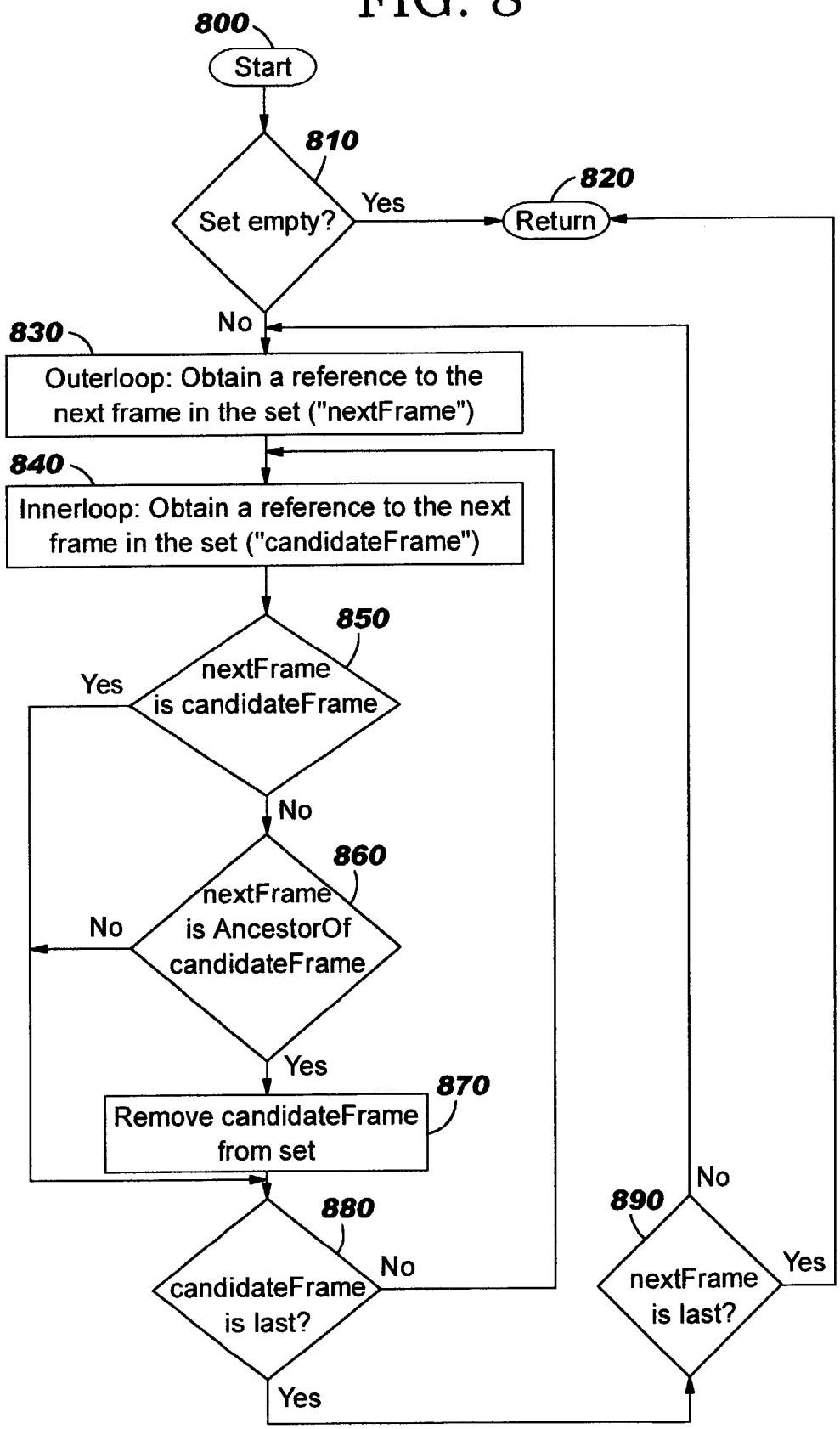

Referring now to FIGS. 7 and 8, logic is depicted that may be used by an implementation of the present invention to determine, when processing a client's request for a frame refresh, whether other frames and/or GUI objects should be rendered at the client as well. If so, then the appropriate change indicators, such as procedural scripting code (illustrated by the sample in FIG. 9), are generated to cause the client to issue further content requests.

The processing of FIG. 7 performs the basic reload queue processing, invoking the logic of FIG. 8. Upon entering this logic (Block 700), the references to the frames that have been recently rendered (which may be determined using features of HTTP) are moved (Block 705) from the reload queue to a new collection for processing. (Because there are a forest of frame trees, i.e., disjointed frame hierarchies, not all frames in the queue will be reloaded responsive to the client browser's request. As a result, some references may be left on the reload queue.)

As a performance enhancement, Block 710 adds a reference to the client-requested frame, or "CRF", to the processing collection created in Block 705. Block 715 then removes any duplicate frame references, preferably by invoking a built-in function or method that forms a set from a given input collection. This processing set is then used in the subsequent processing of FIGS. 7 and 8.

In Block 720, the frame hierarchies are examined, and all frame references that are descendents of any other frame in the set are removed from the processing set. This process comprises taking every frame reference in the set and traversing its location within its frame hierarchy, as described in more detail below with reference to FIG. 8. As a result, the processing set then contains only frame hierarchy roots that do not have any hierarchical relationship with others in the set. (A "frame hierarchy root" may be either an absolute root in the complete frame hierarchy or a root of a subtree in the hierarchy.) Upon returning from FIG. 8, Block 725 checks to see if the CRF is still in the processing set. If so, that means that the CRF formed one of the frame hierarchy roots, and control transfers to Block 755, where the CRF is then removed from the set. (This is because the CRF will be returned to the requester according to standard HTTP processing, and thus this frame does not need to be processed by the logic of Block 730.) However, if the CRF is not in the processing set, then one of its ancestors is in the set (according to the processing of FIG. 8). Therefore, because reloading the ancestor will automatically reload the CRF, Block 750 sets an indicator that the response to the client browser may be optimized by using empty or minimal content for this frame (as has been discussed above with reference to Block 345 of FIG. 3).

Following the processing of Block 750 or Block 755, Block 740 checks to see if the processing set is now empty. If so, at Block 745, control returns to the invoking logic (i.e., Block 340 of FIG. 3). Otherwise, Blocks 735 and 730 iteratively process the entries in the processing set by removing the next frame reference (Block 735) and generating frame reload information (also referred to herein as a change indicator) for the referenced frame. The sample syntax in FIG. 9, described below, is used to explain one way in which this may be performed. Control then returns to Block 740 to continue processing entries in the processing set.

The logic in FIG. 8 begins (Block 800), where the input to this processing is the processing set of candidate frame references for loading (created in Block 715 of FIG. 7) and the server-side frame hierarchies. Block 810 checks to see if the processing set is empty. If so, control returns (Block 820) to the invoking logic in FIG. 7. Otherwise, processing continues at Block 830. Blocks 830–890 form an "outer loop" and Blocks 840–880 form an "inner loop". The outer loop iterates over all of the elements in the set. The inner loop then takes the selection from the outer loop, and compares it to all members of the set. In this way, each member is compared to each other member to see if they are ancestors of each other. (As will be obvious to one of ordinary skill in the art, many alternative approaches may be used for determining the roots of trees. This nested looping technique is one such approach, and works well if the size of the processing set is relatively small, for example, in the tens of elements.)

The outer loop begins (Block 830) by obtaining the next frame reference in the processing set. This frame reference is referred to as "nextFrame". Block 840 obtains a different one of the frame references in the set, and this reference is referred to as "candidateFrame". Block 850 checks to see if these references are to the same frame. If so, control transfers to Block 880. Otherwise, Block 860 checks to see if nextFrame is an ancestor of candidateFrame. If so, then candidateFrame is removed from the processing set (Block 870) as being redundant. (That is, the reference to nextFrame will cause its descendents to be reloaded, and therefore it is not necessary to generate change indicators for the descendent candidateFrame.)

Block 880 checks to see if candidateFrame is the last frame reference to be compared to nextFrame. If not, the inner loop iterates again by returning control to Block 840. Otherwise, control transfers to Block 890, which checks to see if nextFrame is the last frame reference in the processing set for purposes of the outer loop. Control returns to Block 830 to continue iterating the outer loop if this test has a negative result, whereas a positive result causes control to return (Block 820) to the invoking logic in FIG. 7.

After processing the frame references according to FIGS. 7 and 8, what remains is a mathematical set where each member has no hierarchical relationship to other members of the set when compared against the complete frame hierarchies maintained by the server-side logic.

Figures 9, 10B:
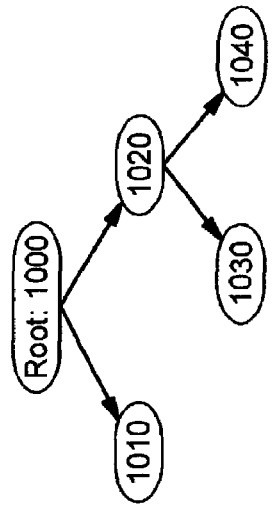
FIG. 9 illustrates one way in which preferred embodiments may identify additional frames that are to be selectively refreshed within a sample multiframe page, and refers to the sample hierarchical frame layout of FIG. 10A (and FIG. 10B corresponds to this layout in FIG. 10A)
Figure 10A:
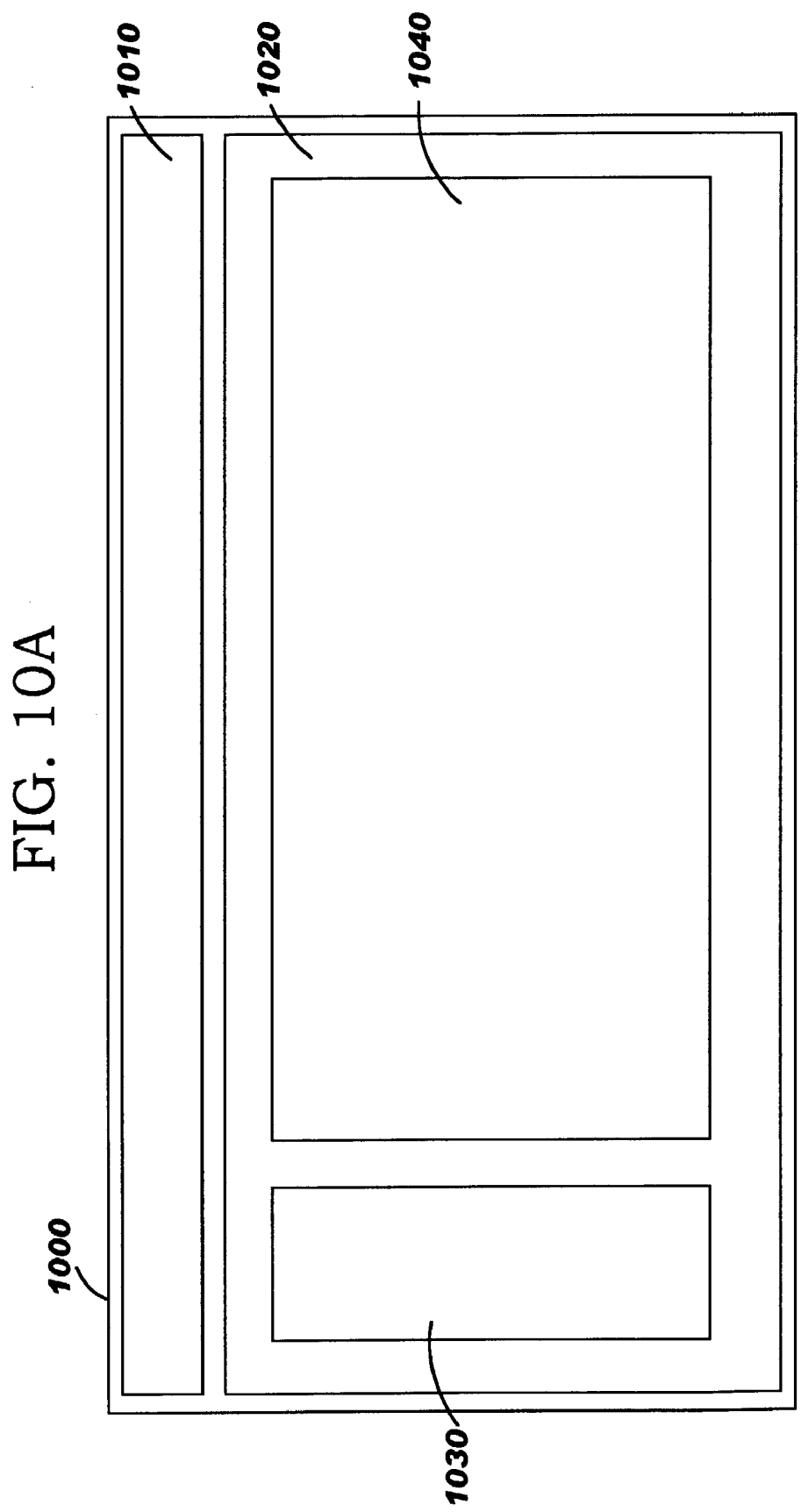

FIG. 9 provides sample syntax that may be used to inform the client browser of additional frames/objects that need to be refreshed. This syntax is also referred to herein as "change indicators" and "procedural scripting code", and in the example, uses the Javascript language. The example in FIG. 9 refers to the sample frame layout depicted in FIG. 10A. In FIG. 10A, a parent window 1000 referred to herein as "samplesTopFrame" contains two child frames 1010, 1020. These two child frames are referred to herein as "samplesToolbarFrame" and "samplesWorkAreaFrame". This second child frame 1020 itself has two child frames 1030, 1040, which are referred to herein as "samplesListFrame" and "samplesContentFrame".

Suppose the client has requested a refresh of the toolbar in "samplesToolbarFrame" 1010. In the prior art, either this would be the only frame refreshed, or in some special cases, the entire parent frame 1000 (including all of its descendents, without regard to whether they had changed) would be refreshed. The selective refreshing approach of the present invention, on the other hand, checks to see which of the frames within this parent/ancestor frame 1000 need to be refreshed, and triggers refreshes of only those frames. For example, suppose that the list frame in "samplesListFrame" 1030 and the content frame in "samplesContentFrame" 1040 have been marked as dirty by the application's business logic. Using the present invention, the frames 1010, 1030, and 1040 can be selectively refreshed, responsive to the client's request for frame 1010. In many cases, this selective refresh will greatly reduce network traffic, as contrasted to prior art approaches of refreshing the entire parent/ancestor frame or using a frame-by-frame polling technique.

FIG. 10B illustrates a frame hierarchy representation of the sample multiframe layout in FIG. 10A, where the nodes in this frame hierarchy are labeled with the numbering using in FIG. 10A. As discussed earlier, preferred embodiments use a forest of such hierarchical trees for efficiently processing the reload queue and as a result, improving transmission to the client browser and reducing frame flicker.

The "<script>" tag in FIG. 9 has a "lang" attribute that identifies the scripting language as Javascript. The content of the <script> tag, in this example, is two invocations of a "reloadFrame" function (see FIG. 11). These invocations cause the refreshing of frames 1030 and 1040, respectively. The <script> tag itself is embedded, in preferred embodiments, within the markup syntax that will render the requested frame 1010 (in response to the client's request for that frame).

Each invocation of the reloadFrame function specifies values for two parameters. The first parameter is a path for the frame that needs to be refreshed, identifying the (possibly-nested) frame within a hierarchical frame layout. In preferred embodiments, the path is expressed in Document Object Model ("DOM") syntax. The second parameter provides a relative or absolute URL of the page that should be loaded within the frame.

The first invocation shown in FIG. 9 for the reloadFrame function identifies the selected frame 1030 ("samplesListFrame"), which is a child of frame 1020 ("samplesWorkAreaFrame"), and provides an address ("/web-samples/samples/action/T2209db") from which the revised frame content may be obtained. The DOM syntax in this example specifies that the selected frame is nested within a frame which itself is a child of the parent frame. Similarly, the second invocation identifies the selected frame 1040 ("samplesContentFrame"), which is also a child of frame 1020 ("samplesWorkAreaFrame"), and provides an address ("/web-samples/samples/action/Tf04dae") from which the revised frame content may be obtained.

FIG. 11 depicts code that may be used to implement the reloadFrame function, and will be readily understandable to those of ordinary skill in the art. This code is preferably attached to (e.g., linked into) the HTML markup syntax that is returned to the client for rendering the client's requested frame. Thus, when the <script> tag shown in FIG. 9 is processed by the client's browser while rendering frame 1010, the code in FIG. 11 will be invoked and will reload each of the dirty frames 1030, 1040.

As has been demonstrated, the present invention provides advantageous techniques for refreshing/loading multiframe displays. Using techniques disclosed herein, prior art problems including rendering of stale/invalid information, inefficient use of resources, and frame flicker are efficiently avoided through the present invention's selective refreshing. An implementation of the present invention may be provided as a service that is usable by server-side application code, allowing the application code to mark any frame as dirty, and then, upon receiving a client's request for a frame reload, handling all dirty frames in a single response (that is, by returning the requested content along with an indication—such as a script encoded in Javascript—of other frames that the client should request). While preferred embodiments were described with reference to a multiframe Web page used for a file manager application, the disclosed techniques may be used with any multiframed client display, or more generally, with any partitioned windowing scheme (such that any partition can be separably refreshed/loaded/painted independently of the other partitions). Examples include a multiple document interface, or "MDI", page; mail clients (where, for example, separate frames are used for mail folders, the mail text itself, the mail list, an address book, etc.); any page with navigation frames; any page with bookmarks; and any page with a page traversal history. Or, implementations of the present invention may be used in a more general sense as a message service, whereby server-side code can queue a message box or other GUI object and then notify the client that this GUI object should be retrieved.

Furthermore, it should be noted that while preferred embodiments were described as using a client-pull solution, advantages of the present invention may also be realized using a server-push model. For example, rather than evaluating the reload queue each time an incoming client request is received, alternative embodiments may trigger the evaluation process using other criteria (such as expiration of a timer at the server, reaching a configurable threshold on the number of client requests received at the server, detecting occurrence of one or more configurable events at the server, and so forth) and send a reload script that reflects the frames that currently need reloading.

Commonly-assigned (and co-pending) U.S. patent application Ser. No. 09/954,951, filed Sep. 18, 2001), which is titled "Low-Latency, Incremental Rendering in a Content Framework", discloses techniques whereby content can be rendered efficiently in a content framework such as a portal page provided by a portal system. Rather than waiting for all portlets to execute and provide their content as an aggregated result for delivering to a client, this commonly-assigned invention responds more quickly to client requests by returning content for those portlets whose content is already available; subsequently, content may be delivered for other "late-finishing" portlets using various disclosed techniques. In the third embodiment of this commonly-assigned invention, portal pages are rendered using frames, and therefore when the output of multiple portlets is to be rendered, the page may be designed as a multiframe page. (The first and second embodiments do not use frames, and the fourth embodiment requires explicit user action; thus, these embodiments are not pertinent to a discussion of the present invention.) In the third embodiment, each frame may hold the content of one portlet (in the first aspect) or multiple portlets (in the optional second aspect). In either case, a separate URL is associated with each frame, and the frame markups sent to the client browser instruct the browser to retrieve content from that URL to be rendered in the frame. In the first aspect of the third embodiment, each frame request sent by the client browser is held at the portal server until the corresponding portlet's content is ready. This is distinct from the selective frame refresh technique of the present invention. In the second aspect of the third embodiment, when the client browser sends a request for a URL representing more than one portlet, the portal server returns the content for as many portlets as are ready when the request is received, and a new version of the frame will then be delivered that includes content from late-finishing portlets. The new version can be delivered by specifying, in the portal server's response, a refresh header or META tag containing a time interval after which the client should send another request for the same content. Or, a multipart MIME ("Multi-purpose Internet Mail Extensions") message may be used to enable the portal server to deliver revised frame content directly to the browser on the portal's initiative, as the late-finishing portlet content becomes available. This second aspect is also distinct from the selective refresh technique of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

What is claimed is:

1. A method of processing multiframe data in a client/server computing environment, comprising steps of:
    maintaining, at a server in the client/server computing environment, for each frame of a plurality of frames comprising a multiframe layout, an indicator corresponding to the frame, wherein the corresponding indicator indicates whether the frame needs to be loaded;
    queuing, for reload processing at the server, a reference to each frame that needs to be loaded in the multiframe layout; and
    sending over a communication network, in a message from the server to a client, (1) content corresponding to a particular one of the frames and (2) data for one or more other frames whose corresponding indicator indicates that the one or more other frames need to be loaded, wherein:
        the queued references are processed, at the server, to identify the one or more other frames;
        the data for the one or more other frames causes the client to automatically send a subsequent request to the server, for each of the one or more other frames, for refreshed content of that other frame; and
        a minimal form of the content corresponding to the particular one of the frames is sent in the message when an ancestor of the particular one has a queued reference and data for the ancestor is included in the data for the one or more other frames.

2. The method according to claim 1, wherein the message is sent from the server responsive to the server receiving a request from the client for the content corresponding to the particular one of the frames.

3. The method according to claim 1, further comprising the steps of:
    receiving, at the client, the message sent from the server; and
    rendering within the multiframe layout, at the client, the content corresponding to the particular one of the frames.

4. The method according to claim 1, further comprising the step of automatically sending, by the client to the server, the subsequent request for refreshed content for each of the one or more other frames, responsive to receiving the message and its data for the one or more other frames.

5. The method according to claim 1, further comprising the steps of:
    receiving, at the client, the message sent from the server;
    rendering within the multiframe layout, at the client, the content corresponding to the particular one of the frames;
    automatically sending, by the client to the server, the subsequent request for refreshed content for each of the one or more other frames;
    receiving, at the client, subsequent response messages sent by the server responsive to receiving the subsequent requests for refreshed content; and
    rendering within the multiframe layout, at the client, content corresponding to the one or more other frames, wherein the content is received in the subsequent response messages.

6. The method according to claim 5, wherein the renderings are visual.

7. The method according to claim 1, wherein the data for the one or more other frames is specified with procedural scripting code.

8. The method according to claim 1, wherein a reference to each frame that needs to be loaded in the multiframe layout is queued for reload processing at the server.

9. The method according to claim 1, wherein at least one of the indicators is set because of change to content of the corresponding frame.

10. The method according to claim 1, wherein at least one of the indicators is set because of change to content of a related frame.

11. The method according to claim 1, wherein at least one of the indicators is set because of asynchronous processing at the server.

12. The method according to claim 1, further comprising the step of determining, prior to operation of the sending step, each frame of the multiframe layout that needs to be loaded, wherein the sending step then sends the data for each determined frame.

13. The method according to claim 1, further comprising the step of suppressing operation of the queuing step for frames that have an already-queued reference.

14. The method according to claim 1, further comprising the step of deleting, for each frame having a queued reference, earlier-queued references to its descendent frames prior to operation of the sending step.

15. The method according to claim 1, wherein the content is encoded in a markup language.

16. The method according to claim 15, wherein the markup language is Hypertext Markup Language.

17. The method according to claim 1, wherein the message sent from the server to the client contains an indication of one or more graphical user interface objects to be rendered at the client, in addition to or instead of the data for the one or more other frames.

18. A system for selectively loading frames of a multiframe layout in a client/server computing environment, comprising:
    means for maintaining, at a server in the client/server computing environment, for each frame of a plurality of frames comprising a multiframe layout, an indicator corresponding to the frame, wherein the corresponding indicator indicates whether the frame needs to be loaded;

means for queuing, for reload processing at the server, a reference to each frame that needs to be loaded in the multiframe layout; and means for sending over a communications network, in a message from the server to a client, (1) content corresponding to a particular one of the frames and (2) data for one or more other frames whose corresponding indicator indicates that the one or more other frames need to be loaded, wherein:

the queued references are processed, at the server, to identify the one or more other frames;

the data for the one or more other frames causes the client to automatically send a subsequent request to the server, for each of the one or more other frames, for refreshed content of that other frame; and a minimal form of the content corresponding to the particular one of the frames is sent in the message when an ancestor of the particular one has a queued reference and data for the ancestor is included in the data for the one or more other frames.

19. The system according to claim 18, wherein the message is sent from the server responsive to the server receiving a request from the client for the content corresponding to the particular one of the frames.

20. The system according to claim 18, further comprising:
means for receiving, at the client, the message sent from the server; and
means for rendering within the multiframe layout, at the client, the content corresponding to the particular one of the frames.

21. The system according to claim 20, further comprising:
means for automatically sending, by the client to the server, the subsequent request for refreshed content for each of the one or more other frames, responsive to receiving the message and its data for the one or more other frames;
means for receiving, at the client, subsequent response messages sent by the server responsive to receiving the subsequent requests for refreshed content; and
means for rendering within the multiframe layout, at the client, content corresponding to the one or more other frames, wherein the content is received in the subsequent response messages.

22. The system according to claim 20, wherein the renderings are visual.

23. The system according to claim 18, wherein the content is encoded in a markup language and the data for the one or more other frames is specified with procedural scripting code.

24. The system according to claim 18, wherein a reference to each frame that needs to be loaded in the multiframe layout is queued for reload processing at the server, and wherein the indicators are set because of change to content of the corresponding frame, because of change to content of a related frame, and/or because of asynchronous processing at the server.

25. A computer program product for selectively refreshing frames of a multiframe layout in a client/server computing environment, the computer program product embodied on one or more computer-readable storage media and comprising:

computer-readable program code for maintaining, at a server in the client/server computing environment, for each frame of a plurality of frames comprising a multiframe layout, an indicator corresponding to the frame, wherein the corresponding indicator indicates whether the frame needs to be loaded;

computer-readable program code for queuing, for reload processing at the server, a reference to each frame that needs to be loaded in the multiframe layout; and computer-readable program code for sending over a communications network, in a message from the server to a client, (1) content corresponding to a particular one of the frames and (2) data for one or more other frames whose corresponding indicator indicates that the one or more other frames need to be loaded, wherein:

the queued references are processed, at the server, to identify the one or more other frames;

the data for the one or more other frames causes the client to automatically send a subsequent request to the server, for each of the one or more other frames, for refreshed content of that other frame; and a minimal form of the content corresponding to the particular one of the frames is sent in the message when an ancestor of the particular one has a queued reference and data for the ancestor is included in the data for the one or more other frames.

26. The computer program product according to claim 25, wherein the message is sent from the server responsive to the server receiving a request from the client for the content corresponding to the particular one of the frames.

27. The computer program product according to claim 25, further comprising:
computer-readable program code for receiving, at the client, the message sent from the server;
computer-readable program code for rendering within the multiframe layout, at the client, the content corresponding to the particular one of the frames;
computer-readable program code for automatically sending, by the client to the server, the subsequent request for refreshed content for each of the one or more other frames;
computer-readable program code for receiving, at the client, subsequent response messages sent by the server responsive to receiving the subsequent requests for refreshed content; and
computer-readable program code for rendering within the multiframe layout, at the client, content corresponding to the one or more other frames, wherein the content is received in the subsequent response messages.

28. The computer program product according to claim 25, wherein the content is encoded in a markup language and the data for the one or more other frames is specified with procedural scripting code.

29. The computer program product according to claim 25, wherein a reference to each frame that needs to be loaded in the multiframe layout is queued at the server, and wherein the indicators are set because of change to content of the corresponding frame, because of change to content of a related frame, and/or because of asynchronous processing at the server.

30. The computer program product according to claim 25, wherein the message sent from the server to the client contains an indication of one or more graphical user interface objects to be rendered at the client, in addition to or instead of the data for the one or more other frames.

* * * * *